US 8,725,868 B2

(12) United States Patent
Arlitt et al.

(10) Patent No.: US 8,725,868 B2
(45) Date of Patent: May 13, 2014

(54) INTERACTIVE SERVICE MANAGEMENT

(75) Inventors: Martin Arlitt, Calgary (CA); Manish Marwah, Palo Alto, CA (US); Cullen E. Bash, Los Gatos, CA (US); Daniel Jurgen Gmach, Palo Alto, CA (US); Amip J Shah, Santa Clara, CA (US); Thomas W Christian, Fort Collins, CO (US); Yuan Chen, Sunnyvale, CA (US); Chandrakant Patel, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 88 days.

(21) Appl. No.: 13/110,539

(22) Filed: May 18, 2011

(65) Prior Publication Data
US 2012/0297385 A1 Nov. 22, 2012

(51) Int. Cl.
*G06F 11/00* (2006.01)

(52) U.S. Cl.
USPC ............ 709/224; 718/104; 718/105; 709/220

(58) Field of Classification Search
USPC ......... 709/224, 223, 220–222, 230–232, 235; 718/100, 104, 105
See application file for complete search history.

(56) References Cited

U.S. PATENT DOCUMENTS

| 7,386,620 | B2 | 6/2008 | Lei et al. | |
|---|---|---|---|---|
| 7,508,778 | B2 | 3/2009 | Yafuso | |
| 7,610,385 | B2 * | 10/2009 | Hundal et al. | 709/227 |
| 7,721,125 | B2 | 5/2010 | Fung | |
| 7,978,617 | B2 * | 7/2011 | von Eicken et al. | 370/252 |
| 8,078,972 | B2 * | 12/2011 | Sullivan et al. | 715/736 |
| 8,275,871 | B2 * | 9/2012 | Ram et al. | 709/223 |
| 2004/0131016 | A1 * | 7/2004 | Hundal et al. | 370/252 |
| 2006/0212594 | A1 * | 9/2006 | Haner et al. | 709/232 |
| 2007/0064604 | A1 | 3/2007 | Chen et al. | |
| 2008/0049786 | A1 * | 2/2008 | Ram et al. | 370/468 |
| 2008/0069005 | A1 * | 3/2008 | von Eicken et al. | 370/252 |
| 2008/0071905 | A1 * | 3/2008 | Sullivan et al. | 709/224 |
| 2009/0088170 | A1 | 4/2009 | Aaron et al. | |
| 2010/0046546 | A1 * | 2/2010 | Ram et al. | 370/468 |
| 2010/0061346 | A1 * | 3/2010 | Wang et al. | 370/336 |
| 2011/0149737 | A1 * | 6/2011 | Muthiah et al. | 370/235 |
| 2012/0179811 | A1 * | 7/2012 | Eicken et al. | 709/224 |

FOREIGN PATENT DOCUMENTS

WO WO-0232161 4/2002

OTHER PUBLICATIONS

Jurca, R., et al. "Reliable QoS Monitoring Based on Client Feedback", May 8-12, 2007 [retrieved on May 18, 2011]. pp. 1003-1011.

* cited by examiner

*Primary Examiner* — Kenneth Coulter (57) ABSTRACT

In one implementation, an interactive service management system includes a performance profile module and a performance evaluation module. The performance profile modules defines a performance measure of an interactive service based on a quality assessment associated with the interactive service. The performance evaluation module compares the performance measure with performance target associated with the interactive service, and modifies the performance target associated with the interactive service based on the comparison of the performance measure and the performance target.

17 Claims, 7 Drawing Sheets

INTERACTIVE SERVICE MANAGEMENT

BACKGROUND

Interactive services such as Web- or Internet-based applications experience loads that vary. Typically, systems that manage interactive services statically assign or provision resources to those interactive services based on worst-case load or use scenarios. For example, an interactive service management system provisions enough resources to an interactive service to meet or satisfy a performance metric for that interactive service under a peak load. Because interactive services frequently operate under loads that are less than their respective peak loads, such interactive services are often over-provisioned. This can lead to under-utilization of the resources allocated to interactive services and, as a result, wasted expenditures on the under-utilized resources.

Alternatively, some systems that manage interactive services dynamically provision resources to those interactive services based on a static criterion such as a response time. Such systems provision, for example, additional resources to interactive services to allow the interactive services to meet the static criterion. Such systems can also result in under-utilization of the resources allocated to interactive services as the static criterion may not accurately reflect a performance or quality that is useful to clients of the interactive services.

DETAILED DESCRIPTION

Implementations discussed herein monitor or profile an interactive service to determine whether a performance target of that interactive service can be altered without causing performance of the interactive service to be unacceptable to clients. More specifically, for example, interactive service management systems and methods discussed herein can determine a performance target for an interactive service that does not reduce the performance of the interactive service below a quality that is acceptable to clients of the interactive service and allows excess resources allocated to an interactive service to be freed or released.

Furthermore, implementations discussed herein can monitor or profile an interactive service to determine whether a performance target of the interactive service should be altered to provide performance of the interactive service of a quality that is acceptable to clients of the interactive service. For example, interactive service management systems and methods discussed herein can determine that a performance target of an interactive service should be altered in response to a load increase, surge, or peak to provide satisfactory performance to clients. Said differently, rather than merely altering an amount of resources allocated to an interactive service to satisfy static requirements or criteria (e.g., response times), implementations discussed herein adjust performance targets to correspond to potentially varying client satisfaction tolerances. In other words, interactive service management systems and methods discussed herein are based on adaptive performance targets or adaptive quality of service. Thus, the performance targets are dynamically modified or adjusted to reflect the performance or quality of interactive services that clients of those interactive services find acceptable or satisfactory.

As used herein, the singular forms "a," "an," and "the" include plural referents unless the context clearly dictates otherwise. Thus, for example, the term "interactive service" is intended to mean one or more interactive services or a combination of interactive services. Additionally, as used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted by or at a processor), or hardware and software hosted at hardware.

Figure 1:
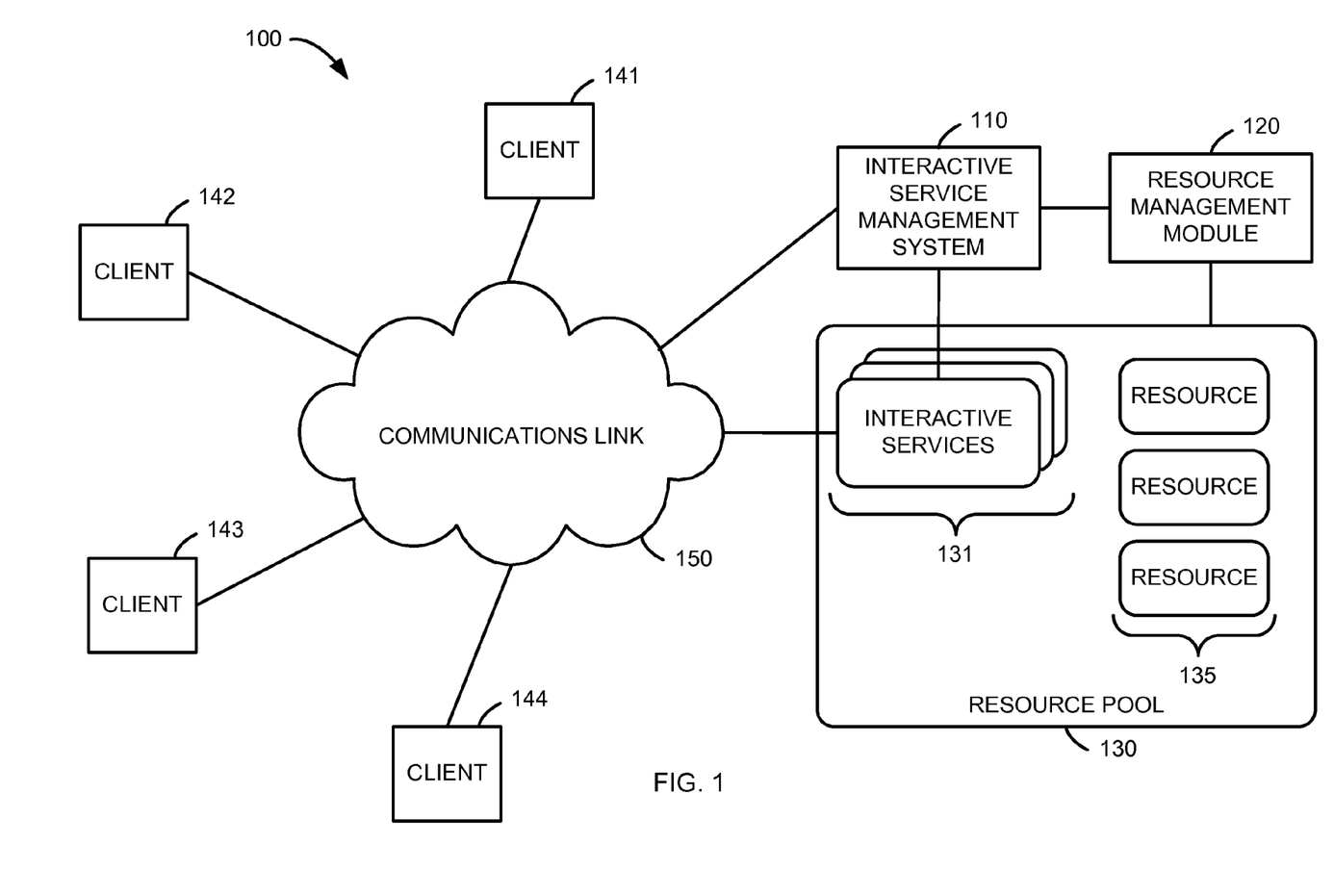
FIG. 1 is an illustration of an example environment including an interactive service management system, according to an implementation.

FIG. 1 is an illustration of an example environment including an interactive service management system, according to an implementation. Environment 100 includes interactive service management system 110, resource management module 120, resource pool 130, clients 141-144, and communications link 150. Resource pool 130 includes resources 135 that are unallocated or not provisioned. In other words, resources 135 are free and available to be provisioned to one or more of interactive services 131. Resource management module 120 can provision resources between resource pool 130, such as resources 135, and interactive services 131 on demand or on an as-needed basis. For example, resource management module 120 can add resources from resource pool 130 to interactive services 131 based on the expectations of clients of interactive services 131, and can remove or free resources from resource pool 130 from interactive services 131 when those resources are underutilized, to lower operational costs, to lower energy consumption, or to satisfy some other operational metric or metrics. In some implementations, resource management module 120 provisions resources from resource pool 130 based on information or signals from interactive service management system 110.

Each interactive service of interactive services 131 receives input from a client and outputs information to the client based on the input. For example, interactive services 131 can be application services such as Web applications that receive input from clients 141-144 and provide output to clients 141-144 in response to the input. A group of such transactions (e.g., input from a client and output to the client) can be referred to as a session. Each of interactive services 131 can be implemented as, for example, a server such as a computing device configured to provide that interactive service, a virtual machine configured to provide that interactive service and hosted at a computing device, or a software application configured to provide that interactive service and hosted at a computing device.

In some implementations, each of interactive services 131 can include multiple services. For example, an interactive service can include a front-end service such as a Hypertext Transport Protocol ("HTTP") service, an application service, and a database service. Furthermore, an interactive service can be distributed across multiple services and/or resources. For example, an interactive service can include multiple instances of an application service and a load balancer to direct clients to instances of the application service based on a utilization level of each instance of the application service or server.

Clients 141-144 communicate with interactive services 131 via communications link 150. That is, a client (e.g., one of clients 141-144) provides data to an interactive service (e.g., one of interactive services 131) and receives, accesses, or consumes data from the interactive service. A client can be, for example, a person, a computing device, a software application hosted at a computing device, or a combination thereof that provides input to an interactive service and receives data from the interactive service. As a more specific example, a client can be a person operating an Internet browser at a computing device to access an interactive service such as a video streaming service via a communications link such as the Internet. The client can select a video at the video streaming service via the Internet browser, computing device, and communications link, and receives video data from the video streaming service via the Internet browser, the computing device, and the communications link.

Communications link 150 includes devices, services, or a combination thereof that define a communications path between clients 141-144, interactive services 131, interactive service management 110, or other devices or services. For example, communications link 150 can include one or more of a cable (e.g., twisted-pair cable, coaxial cable, or fiber optic cable), a wireless link (e.g., radio-frequency link, optical link, or sonic link), or any other connectors or systems that transmit or support transmission of signals. Communications link 150 can include communications networks such as an intranet, the Internet, other telecommunications networks, or a combination thereof. Additionally, communications link 150 can include proxies, routers, switches, gateways, bridges, load balancers, and similar communications devices. Furthermore, the connections or communications paths illustrated in FIG. 1 are logical and do not necessarily reflect physical connections.

Resource management module 120 is a combination of hardware and software that allocates or provisions resources for interactive services 131. For example, as illustrated in FIG. 1, interactive services 131 are included within resource pool 130 because interactive services 131 are hosted at or implemented on resources from resource pool 130 that have been provisioned as interactive services 131 by resource management module 120.

Resources included within resource pool 130 (e.g., resources 135 and resources provisioned to interactive services 131) include various computing resources such as, for example, computing devices, virtual machines, instances of servers configured to provide an interactive service, memory (e.g., persistent, non-volatile, or non-transitory data storage such as databases or hard disks and volatile or transient data storage such as random access memory ("RAM")), communications interfaces (e.g., physical and logical communications interfaces), specialized hardware for real-time audio/video processing, and processors (e.g., physical and logical processors). As an example, resource management module 120 can be a virtual machine management system that provisions a group of virtual machines with processors, memory, and communications interfaces to provide interactive services 131.

Furthermore, resource management module 120 receives information related to or associated with the performance of interactive services 131, and alters the resources provisioned to interactive services 131 based on that information. For example, resource management module 120 can provision more resources for one of interactive services 131 if resource management module 120 receives information indicating that this interactive service is not satisfying a performance target. Similarly, for example, resource management module 120 can remove resources from one of interactive services 131 (i.e., provision the resources to not provide this interactive service) if resource management module 120 receives information indicating that this interactive service is satisfying a performance target.

Moreover, resource management module 120 can provision resource of resource pool 130 based on various parameters or conditions of, for example, resource pool 130 or interactive service 131. As an example, resource management module 120 can monitor the resources provisioned to an interactive service and ensure that a minimum amount of resources are provisioned to the interactive service based on the values of performance targets provided by interactive service management system 110. As another example, resource management module 120 can provision additional resources to an interactive service more conservatively when the available or free resources in resource pool 130 are below a threshold than when the available or free resources in resource pool 130 are above the threshold.

Interactive service management system 110 is a combination of hardware and software that monitors one or more of interactive services 131 and determines the performance of the one or more of interactive services 131. For example, interactive service management system 110 can receive feedback (e.g., performance indicators) related to or associated with one of interactive services 131 from one or more of clients 141-144, and can determine how well that interactive service is performing relative to a performance target or performance metric (e.g., whether the interactive service is satisfying the performance target or performance metric) based on the feedback. In some implementations, interactive service management system 110 can monitor or access operational attributes of that interactive service to determine how well that interactive service is performing relative to a performance target or performance metric.

Furthermore, in some implementations, interactive service management system 110 provides information about the performance of one of interactive services 131 to resource management module 120 or another entity to report on the performance of the interactive service. Resource management module 120, for example, can use this information to provision more or fewer resources in resource pool 130 to that interactive service.

Figure 2:
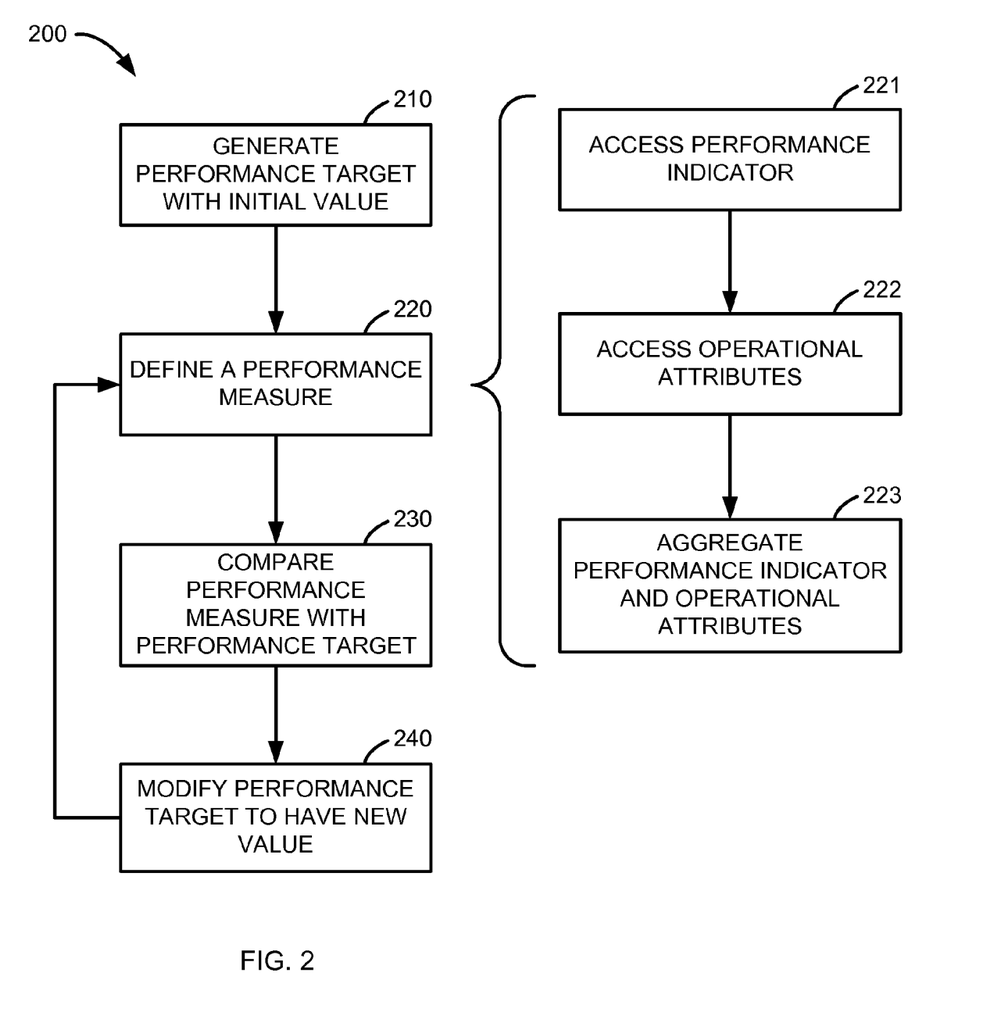
FIG. 2 is a flowchart of an example interactive service management process, according to an implementation.

As an example of the functionality of interactive service management system 110, FIG. 2 is a flowchart of an example interactive service management process that can be implemented at an interactive service management system, according to an implementation. A performance target is generated with an initial value at block 210, for example, when the interactive service management system is launched or initialized.

A performance target is an acceptable performance measure for an interactive service. That is, a performance measure for an interactive service can be compared with a performance target for the interactive service to determine whether the performance of the interactive service is acceptable. If the performance measure satisfies the performance target, performance of the interactive service is acceptable. If the performance measure does not satisfy the performance target, performance of the interactive service is not acceptable.

The performance target can be generated at block 210 based on, for example, an acceptable quality or performance metric for an interactive service. For example, a performance metric for an interactive service can be accessed at a database or configuration file and used to generate a performance target with an initial value based on the performance metric at block 210.

In some implementations, the initial value of the performance target can be a value that is likely to provide clients more than adequate performance at the expense of additional resources being used. Then, over time, the excess resources will be reclaimed as the performance target is modified, as discussed in more detail herein. Alternatively, for example, an opposite approach can be used. That is, the initial value of the performance target can be a value that results in few resources provisioned to an interactive service. Additional resources can then be provisioned to the interactive service if the clients are not satisfied with the performance of the interactive service.

In yet other implementations, values related to performance targets can be recorded or stored in a database, and these values can be used to estimate an initial value for a performance target. An interactive service management system can access these values (e.g., initial values or values related to numbers and sizes of resource changes for interactive services that are the same as or are similar to—e.g., based on the type of service provided of the resources used—an interactive service for which a performance target is to be generated) at a database, and then generate an estimated or appropriate initial value of the performance target based on the initial values from the database. Such implementations can efficiently (e.g., more quickly) right-size the resources provisioned to an interactive service. That is, the interactive service management system can more rapidly converge to a number of resources that provide satisfactory performance of the interactive service to clients without over-provisioning resources to the interactive service.

A performance metric defines acceptable performance of an interactive service. Some, performance metrics include probabilistic or statistical values or distributions. As an example, a performance metric can be a response time for a particular percentage of requests received from clients of an interactive service. As a more specific example, a performance metric can define an acceptable quality level or performance for the interactive service as a 300 ms maximum response time for 99.9% of requests from clients.

In some implementations, a performance metric can be a vector of quantitative or qualitative values where each value is associated with a dimension of an interactive service and defines what performance measure is acceptable for that dimension. For example, a performance metric can define an acceptable quality level for the interactive service as a 300 ms maximum response time for 99.9% of requests and 99.997% uptime. Moreover, the performance metric can have a dimension of a time interval or period (e.g., a day, a week, a month, an hour, or some other period or interval). For example, a performance metric can define an acceptable quality level for the interactive service as a 300 ms maximum response time for 99.9% of requests and 99.997% uptime during a week. In some implementations, the initial value of the performance target generated at block 210 can be a combination of the values of the dimensions of the performance metric. Alternatively, the performance target can include an initial value for each of the dimensions of the performance metric. In other words, the performance target can be a single value or a group (e.g., a vector or matrix) of values.

A performance measure of the interactive service is then defined at block 220. For example, the performance measure can be defined during or based on a quality assessment of the interactive service. A performance measure is a quantitative or qualitative measure or description of the performance of an interactive service. In other words, a performance measure describes the performance or quality of an interactive service. Furthermore, a performance measure can be relative to a single dimension or to multiple dimensions. As an example, a performance measure can be an average response time of an interactive service to client requests. That is, the performance measure describes the average amount of time elapsed between client requests and responses from the interactive service. Thus, the performance measure is relative to a response time dimension.

As another example, a performance measure can be a data set (e.g., a vector or matrix) that includes a value of an average response time of an interactive service to client requests, a boolean (e.g., true or false) value indicating whether a client is satisfied with the performance of the interactive service, and a value representing a count of the number of sessions aborted by clients within a period of time. In this example, the performance measure is relative to a response time dimension, a client satisfaction dimension, and aborted session dimension. In other implementations, values or data from multiple dimensions can be aggregated or combined to define a performance measure as a single value. Furthermore, each value or data of a performance measure (e.g., a value or data for each dimension) can be referred to as a performance measure. Thus, a performance measure can be a group of performance measures.

Additionally, a performance measure can include a probabilistic or statistical value or distribution. For example, a performance measure can include an average response time and a percentage of requests or responses. As a specific example, the performance measure can specify or describe the average response time of 99.8% responses to requests from clients of an interactive service. Such probabilistic or statistical values or distributions are additional dimensions of a performance measure.

Furthermore, a performance measure can be defined or generated using previous performance measures, previous performance targets, or other values related to an interactive service that was generated or defined earlier. Said differently, a performance measure can include historical information related to or associated with an interactive service. That is, historical information related to a client (e.g., information related to performance thresholds or expectations of a client), to one or more communication links, an interactive service management system, or to other devices or services can be used to define a performance measure. For example, an interactive service management system can access values related to historical or previous performance indicators, operational attributes, times related to such performance indicators and operational attributes, or combinations thereof at a database, other data store, or data storage service, and include those values in a quality assessment.

In some implementations, historical information can be accessed to prevent oscillations in resources provisioned to an interactive service. That is, a performance measure can be altered if historical information indicates that there has been a recent change in the resources provisioned to an interactive service. As a specific example, a performance measure can be reduced (e.g., to suggest that an interactive service is providing a lower quality) if historical information indicates that additional resources were recently provisioned to that interactive service. Thus, performance measure can be held for a time below a threshold at which the additional resources may be freed from the interactive service.

A quality assessment is a determination of the quality or performance of an interactive service. In other words, a quality assessment produces a value describing the quality or performance of the interactive service. Blocks 221, 222, and 223 are an example of a quality assessment. More specifically, the quality assessment illustrated at FIG. 2 includes accessing a performance indicator at block 221, accessing a group of operational attributes of an interactive service at block 222, and aggregating the performance indicator and operational attributes at block 223 to define a performance measure. In other words, the quality assessment can include values of multiple dimensions (or be relative to multiple dimensions). Alternatively, the quality assessment can include a value of a single dimension. For example, the output or result of a quality assessment can be a performance measure based on a performance indicator received during the quality assessment.

Accordingly, the performance measure is defined based on performance indicators (e.g., performance indicators received from clients) of the interactive service, operational attributes of the interactive service, or a combination thereof. A performance indicator describes or indicates whether or to what degree or extent an interactive service is performing satisfactorily or acceptably. In some implementations, a performance indicator is received from or provided by a client and, as such, provides direct feedback related to the client's satisfaction with the performance or quality of an interactive service. For example, a performance indicator can be a boolean value received from a client that describes whether performance of an interactive service is satisfactory or unsatisfactory to a client of the interactive service.

In some implementations, a performance indicator describes a degree to which performance of an interactive service is satisfactory to a client of the interactive service. For example, a performance can be an integer value provided by a client that is between one and ten, where the value of one represents unsatisfactory performance, the value of ten represents highly satisfactory performance, and the intervening values represent increasing—from two to nine—satisfaction in the performance. As another example, a request for enhanced performance (or a performance request) from a client to an interactive service or interactive service management system can be a performance indicator that indicates the performance of the interactive service is not satisfactory to the client. Furthermore, a lack of performance requests or performance indicators indicating that performance is unsatisfactory to a client can be a performance indicator (e.g., indicating that performance is satisfactory).

An operational attribute describes a characteristic or condition of the operation of an interactive service. An average response time, a number of aborted sessions, a data rate, jitter, mean time to repair, mean time to recovery, a number of operations per second, communications throughput, and mean time between failures are examples of operational attributes. Other examples of operational attributes include: an increase or decrease in the number of clients of an interactive service; a number of times or percentage of transactions (e.g., responses to client requests received by an interactive service) that have resulted in violations of a performance target or metric (e.g., the number of times a response was not provided to a client within a specified time period); a number of session that were aborted by a client or that the client ended prematurely (e.g., before a complete video was provided to a client by a video streaming service); or other abnormal client behavior or interaction (e.g., a client frequently repeating a request before a full response to that request has been provided by an interactive service).

The interactive service management system can monitor or track such operational attributes, or can access operational attributes at, for example, an analytics system. In other words, the interactive service management system can use operational attributes of an interactive service to access or assess indirect feedback from a client. As specific examples, the number of aborted sessions or repeated requests before full responses to those requests have been provided by an interactive service can indirectly indicate that a client or group of clients are not satisfied with the performance of the interactive service.

The performance measure defined at block 220 is compared with the performance target at block 230 to determine whether the performance measure satisfies the performance target. Said differently, the performance measure defined at block 220 is compared with the performance target at block 230 to determine whether the interactive service is providing an acceptable quality or acceptable performance.

The conditions under which a performance target is satisfied by a performance measure can vary from one implementation to another. A performance target is satisfied by a performance measure (or when a performance measure has a value or values) that indicates that the performance of an interactive service is satisfactory or acceptable to a client. As an example, in some implementations, a performance target is satisfied if a performance measure has a value less than or equal to the performance target. In other implementations, a performance target is satisfied if a performance measure has a value greater than the performance target. In yet other implementations, a performance target is satisfied if a majority or all of the dimensions of a performance measure have values that are greater than the values of corresponding dimensions of the performance target.

As more specific examples, a performance target can be satisfied when a performance measure indicates that a majority of the dimensions of a performance measure are less than corresponding dimensions of the performance target or when a performance measure indicates that a majority of the dimensions of a performance measure have violated (e.g., exceeded or failed to meet) thresholds (e.g., ranges of values for corresponding dimensions of the performance target). For example, a performance target can be a range, and the performance target is satisfied if the performance measure is within the range. Alternatively, the performance target can be satisfied if the performance measure is outside the range. Although the above examples have been provided to illustrate specific implementations, performance targets can be satisfied under other or additional conditions.

The performance target is then modified at block 240 based on block 230. Generally, if the performance measure satisfies the performance target—or the initial value of the performance target—(i.e., the interactive service is providing acceptable performance), the new value of the performance target is lower than the initial value. That is, the new value of the performance target indicates that lower performance may be acceptable. Alternatively, if the performance measure does not satisfy the performance target—or the initial value of the performance target—(i.e., the interactive service is not providing acceptable performance), the new value of the performance target is higher than the initial value. That is, the new value of the performance target indicates that higher performance is desirable.

In some implementations, the new value of the performance target can be at least partially based on historical information related to an interactive service. As an example, the new value of the performance target can be modified or altered (e.g., increased or decreased) based on historic information to, for example, prevent resources from being frequently provisioned to or freed from the interactive service. Thus, historical information can be used to define a performance measure and/or to modify a performance target.

Process 200 then returns to block 220 to define another performance measure, and blocks 220, 230, and 240 are repeated. Thus, process 200 runs continuously to modify the performance target of the interactive service. In other words, the performance target of the interactive service is assigned different values based on a relationship between the current value of the performance target and a performance measure. In some implementations, process 200 delays between blocks 220 and 240 to allow changes in resource allocation to an interactive service or a load on the interactive service to change. In other words, process 200 can run periodically.

Process 200 can include additional or fewer blocks than those illustrated in FIG. 2. For example, the performance measure defined at block 220 can be modified based on historical information related to an interactive service before block 230. That is, process 200 can include one or more blocks at which historical information related to an interactive service is accessed and applied to (e.g., used to modify) a performance measure. Additionally, blocks of process 200 can be rearranged. As an example, an interactive service management system can manage a group of interactive services, and a performance target and performance measure for each of the interactive services can be generated, defined, compared, and modified during process 200. In some examples, an interactive service management system can include or access (e.g., at client profiles) a performance metric for each client of an interactive service, and a performance target and performance measure for each of the clients can be generated, defined, compared, and modified during process 200. In other words, performance of the interactive service can be managed on a per-client basis.

As a specific example, process 200 can include an additional block at which an interactive service management system implementing process 200 stores or updates a performance metric associated with a particular client (e.g., at a client profile or account for that client) when a performance target for that client is modified. Alternatively, for example, the performance metric can be updated when a performance indicator indicates or suggests that the performance of the interactive service is acceptable or satisfactory to the client.

Figure 3A:
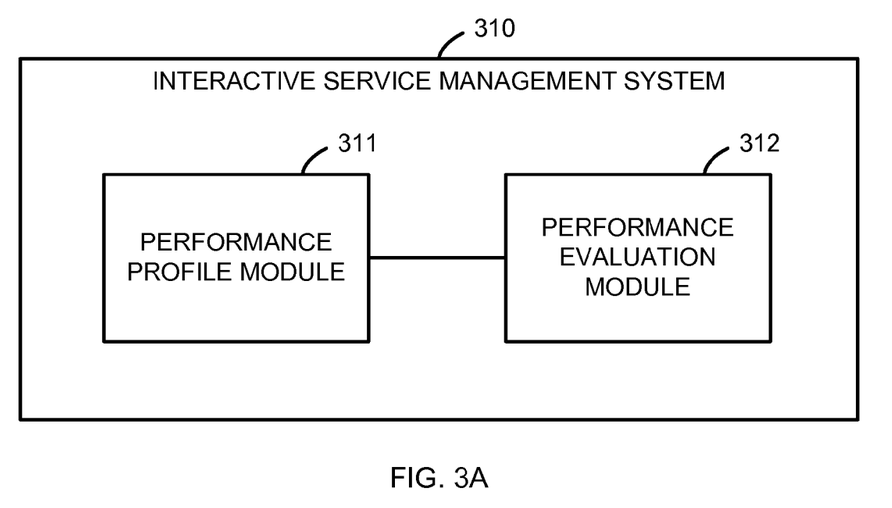
FIGS. 3A and 3B illustrate two examples of an interactive service management system, according to an implementation.
Figure 3B:
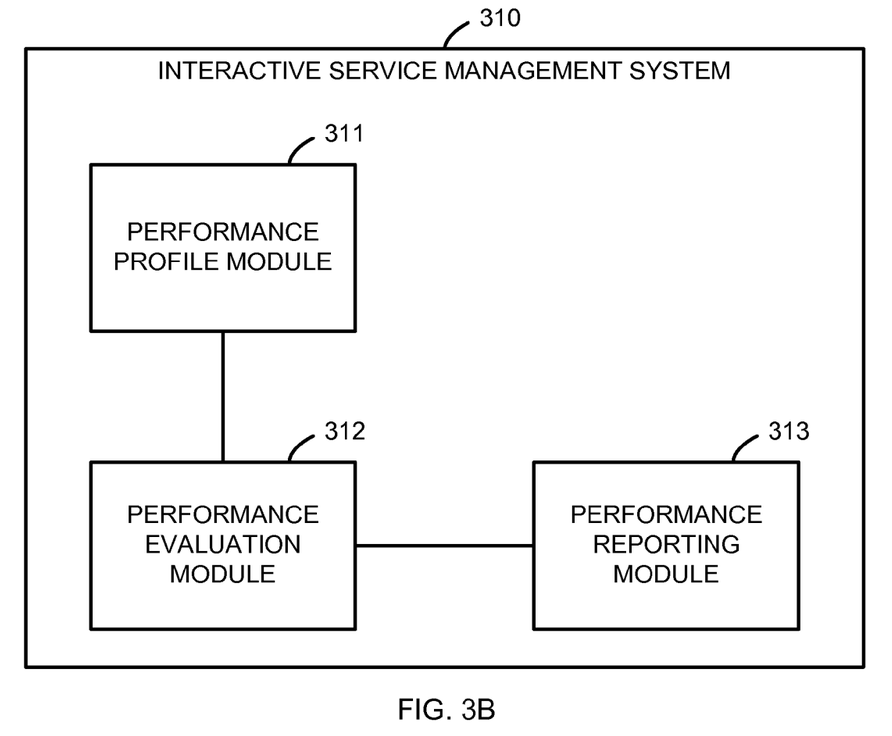

FIGS. 3A and 3B illustrate two examples of an interactive service management system. As illustrated in FIG. 3A, interactive service management system 310 includes performance profile module 311 and performance evaluation module 312.

Performance profile module 311 performs a quality assessment for one or more interactive services to generate or define performance measures of the one or more interactive services. For example, performance profile module 311 can periodically receive or access performance indicators and operational attributes related to an interactive service, and generate performance measures of that interactive service based on those performance indicators and operational attributes.

In some implementations, performance profile module 311 can communicate (e.g., exchange symbols or signals representing information) with clients of interactive service management system 310 to access performance indicators of an interactive service. As a specific example, the interactive service can be a Web application that includes a mechanism such as a control (e.g., a push-button, a slide control, or a text input box) or an application programming interface ("API") via which the clients of the interactive service can indicate to performance profile module 311 that the performance or quality level of the interactive service is not acceptable. The clients can provide performance indicators to performance profile module 311 via that mechanism, and performance profile module 311 can access and evaluate those performance indicators during a quality assessment to define a performance measure. For example, a video player client of a video streaming interactive service can provide a performance indicator to the video streaming interactive service via the API to indicate that performance of the video streaming interactive service is not satisfactory or acceptable if a frame rate or bit rate of a streaming video is not within a threshold (e.g., if the frame rate or bit rate is below a predetermined or preselected threshold). Alternatively, the video player client can provide a performance indicator to the video streaming interactive service via the API to indicate that performance of the video streaming interactive service is satisfactory or acceptable if the frame rate or bit rate is within the threshold.

In some implementations, performance indicators can be authorized or unauthorized. For example, some clients are allowed or authorized to provide performance indicators and other client are not allowed or not authorized to provide performance indicators. Performance indicators provided by the clients allowed or authorized to provide performance indicators can be referred to as authorized performance indicators. Performance indicators provided by the clients not allowed or not authorized to provide performance indicators can be referred to as unauthorized performance indicators. As another example, in some implementations, clients are allowed or authorized to provide a number of performance indicators within a time period. Performance indicators provided by the clients that do not exceed the number within the time period can also be referred to as authorized performance indicators. Performance indicators provided by the clients that exceed the number within the time period can also be referred to as unauthorized performance indicators. Performance profile module 311 can, for example, accept or process authorized performance indicators, and can reject, discard, or ignore unauthorized performance indicators.

After defining performance measures, performance profile module 311 provides the performance measures to performance evaluation module 312. Performance evaluation module 312 determines whether a performance measure satisfies a performance target and modifies the performance target (or generates a new or updated performance target) based on whether the performance measure satisfies the performance target. For example, performance evaluation module 312 can receive a performance measure from performance profile module 311, and compare the performance measure with a performance target for the interactive service. If the performance measure satisfies the performance target, performance evaluation module 312 can modify the performance target to be more resource-restrictive. An updated performance target that is more resource-restrictive than an original performance target indicates that the interactive service can provide an acceptable quality level or performance with fewer resources than are presently provisioned to the interactive service. In other words, resources can be provisioned (or deallocated) from the interactive service to a resource pool.

Alternatively, for example, if the performance measure does not satisfy the performance target, performance evaluation module 312 can modify the performance target to be less resource-restrictive. An updated performance target that is less resource-restrictive than an original performance target indicates that additional resource should be allocated to the interactive service to provide an acceptable quality level or performance. In other words, resources can be provisioned (or allocated) to the interactive service from a resource pool.

In some implementations, the updated performance target (or modified value of the performance target) defined at performance evaluation module 312 indicates a degree to which a performance measure satisfies or does not satisfy the original performance target. For example, if the performance measure does not satisfy the original performance target by a significant amount, the updated performance target can be significantly less resource-restrictive than the original performance target. Similarly, if the performance measure does not satisfy the original performance target by a small amount, the updated performance target can be slightly less resource-restrictive than the original performance target.

Alternatively, for example, the updated performance target can be the same as the original performance target if the performance measure is within a predefined or predetermined tolerance or threshold of the original performance target. That is, performance evaluation module 312 can leave the original performance target unmodified if the difference between the performance measure and the original performance target (e.g., the degree to which the performance measure satisfies or does not satisfy the original performance target) is within the tolerance or threshold.

As illustrated in FIG. 3B, interactive service management system 310 includes performance profile module 311, performance evaluation module 312, and performance reporting module 313. Although these modules are illustrated and discussed herein as separate components or elements of interaction service management system 310, two or more of these modules can be aggregated or combined into a common module. In other words, the modules—or functionalities thereof—of interaction service management system 310 can be implemented or realized in configurations other than those illustrated in FIG. 3B.

Performance profile module 311 and performance evaluation module 312 are discussed about in relation to FIG. 3A.

Performance evaluation module 312 provides updated performance targets to performance reporting module 313. Performance reporting module 313 provides information related to the performance of an interactive service to a resource management module. For example, performance reporting module 313 can provide an updated performance target to a resource management module to alter the resources provisioned for or to an interactive service. In some implementations, performance reporting module can provide the updated performance target to an administrator of interactive service management system 310 via, for example, an electronic mailbox, instant messaging, or other messaging systems. Said differently, performance reporting module 313 reports information related to an interactive service or a group of interactive services.

Furthermore, performance reporting module 313 can provide information related to the status (e.g., load or performance) or a status indicator of an interactive service managed by interactive service management system 310 such as a performance measure or performance target to clients of the interactive service. In some implementations, an interactive service such as a Web application can include an API via which performance reporting module 313 can provide an indication of the load or performance of the interactive service to clients of the interactive service. For example, a graphic can be displayed at a Web browser of a client that indicates a relative load (e.g., low, medium, or high) of the interactive service. Thus, the client can be informed of the status of the interactive service.

Figure 4:
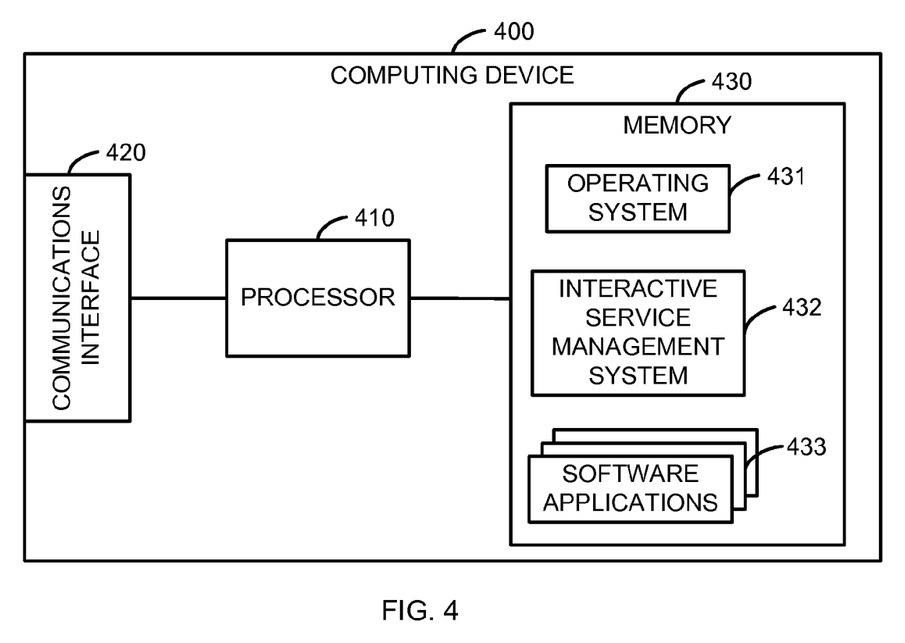
FIG. 4 is a schematic block diagram of an example computing device hosting an interactive service management system, according to an implementation.

FIG. 4 is a schematic block diagram of an example computing device 400 hosting an interactive service management system, according to an implementation. Computing device includes processor 410, communications interface 420, and memory 430. Processor 410 is any combination of hardware and software that executes or interprets instructions, codes, or signals. For example, processor 410 can be a microprocessor, an application-specific integrated circuit ("ASIC"), a distributed processor such as a cluster or network of processors or computing device, or a virtual machine.

Communications interface 420 is a module in communication with processor 410 via which computing device 400 communicates (e.g., exchange symbols or signals representing information) with other computing devices or services. For example, communications interface 420 can be a network (e.g., Ethernet, Fiber Channel, or InfiniBand) interface, a telephonic interface, or another communications interface. Furthermore, communication interface 420 can be wired (e.g., exchange electrical signals or optical signals via wires, cables, or waveguides) or wireless.

Memory 430 is a processor-readable medium that stores instructions, codes, data, or other information. For example, memory 430 can be a volatile random access memory ("RAM"), a persistent or non-transitory data store such as a hard disk drive or a solid-state drive, or a combination thereof or other memories. Furthermore, memory 430 can be integrated with processor 410, separate from processor 410, or external to computing device 400.

As illustrated in FIG. 4, memory 430 includes operating system 431, interactive service management system 432, and software applications 433. Operating system 431, interactive service management system 432, and software applications 433 are each instructions or code that when executed at processor 410, cause processor 410 to perform operations that implement, respectively, operating system 431, interactive service management system 432, and software applications 433. Said differently, operating system 431, interactive service management system 432, and software applications 433 are hosted at computing device 400.

More specifically, interactive service management system 432 includes code or instructions that implement modules such as performance profile module 311, performance evaluation module 312, and performance reporting module 313. Additionally, interactive service management system 432 includes code or instructions that implement processes such as processes 200, 500, and 600 discussed in relation to FIGS. 2, 5, and 6, respectively.

In some implementations, an interactive service management system can be hosted or implemented at a computing device appliance (or appliance). That is, the interactive service management system can be implemented at a computing device that is dedicated to hosting the interactive service management system. For example, the interactive service management system can be hosted at a computing device with a minimal or "just-enough" operating system to support the interactive service management system. Furthermore, in an example, the interactive service management system can be the only, exclusive, or primary software application hosted at the appliance.

Figure 5:
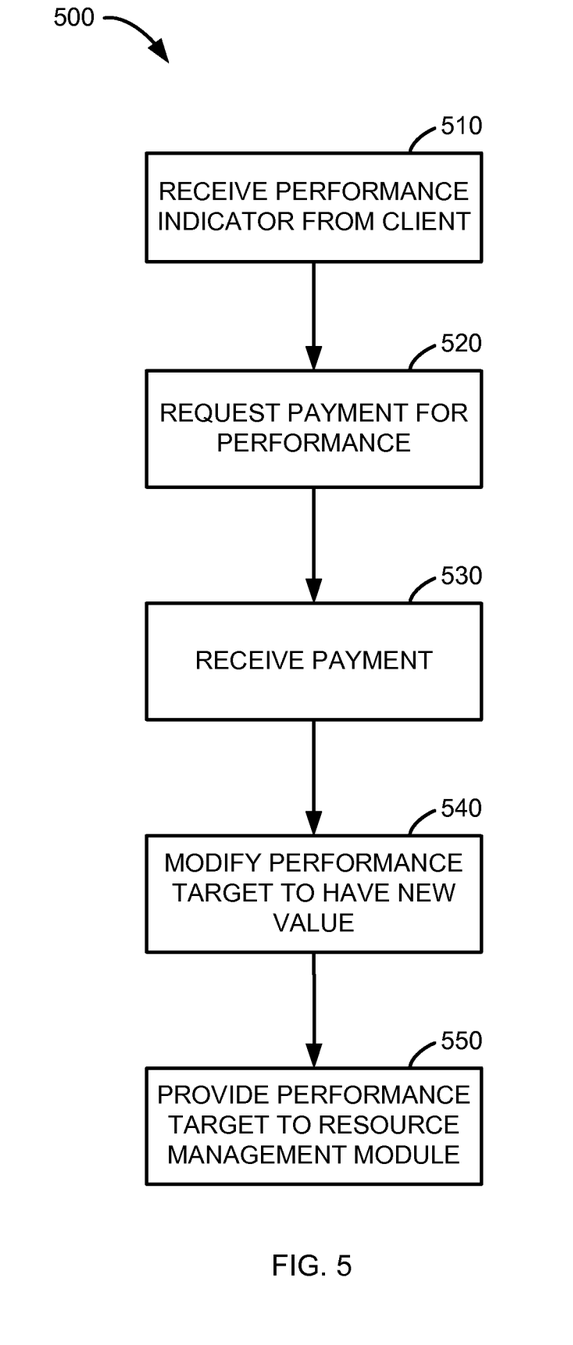
FIG. 5 is a flowchart of an example interactive service management process, according to another implementation.

FIG. 5 is a flowchart of an example interactive service management process that can be implemented at a combination of hardware and software, according to another implementation. A performance indicator is received from a client at block 510 that describes whether the performance or quality of an interactive service is acceptable to the client. As a specific example, the performance indicator can include a request for enhanced performance of the interactive service (or a performance request).

In the example illustrated in FIG. 5, a payment for the requested performance is requested at block 520. For example, the client can be directed to a secure web page via which the client can provide payment information such as credit card, bank account, or other information that an interactive service management system implementing process 500 can use to assess a charge or access payment for the requested performance (e.g., assess a charge against an account based on the information provided by the client). Alternatively, for example, the client can provide the payment information via an API of the interactive service or interactive service management system. As yet another alternative, the interactive service management system can access payment information at a client profile (or account) associated with the client.

The interactive service management system receives the payment information at block 530 and processes the payment. In some implementations, the payment is processed before process 500 proceeds to block 540. In other implementations, the payment information is stored or cached for later processing, and process 500 proceeds to block 540 before the payment is processed.

The performance target is modified to a new value based on the performance indicator at block 540. In other words, the performance target is modified to a less resource-restrictive value. The performance target is then provided to a resource management module at block 550 to request additional resources for the interactive service to provide acceptable performance or quality to the client. Alternatively, the resource management module can migrate the interactive service or a portion of the interactive service that is communicating with or serving the client to a different set or cluster of resources to provide the acceptable performance or quality to the client. Thus, in some implementations, a client can pay for enhanced performance of an interactive service.

Process 500 can include additional or fewer blocks than those illustrated in FIG. 5. Additionally, blocks of process 500 can be rearranged. For example, in some implementations, the cost of enhanced performance varies with the degree of enhanced performance requested, the time at which enhanced performance is requested, of the status of the interactive service for which enhanced performance was requested. As a specific example, process 500 can include an additional block at which the interactive service management system provides status indicators to a client via the interactive service or independent of the interactive service. If the status indicator indicates a low load on the interactive service or low utilization of resources in a resource pool at which the interactive service is hosted, the cost of enhanced performance can be low or free. Alternatively, if the status indicator indicates a high load on the interactive service or high utilization of resources in a resource pool at which the interactive service is hosted, the cost of enhanced performance can be increased.

Figure 6:
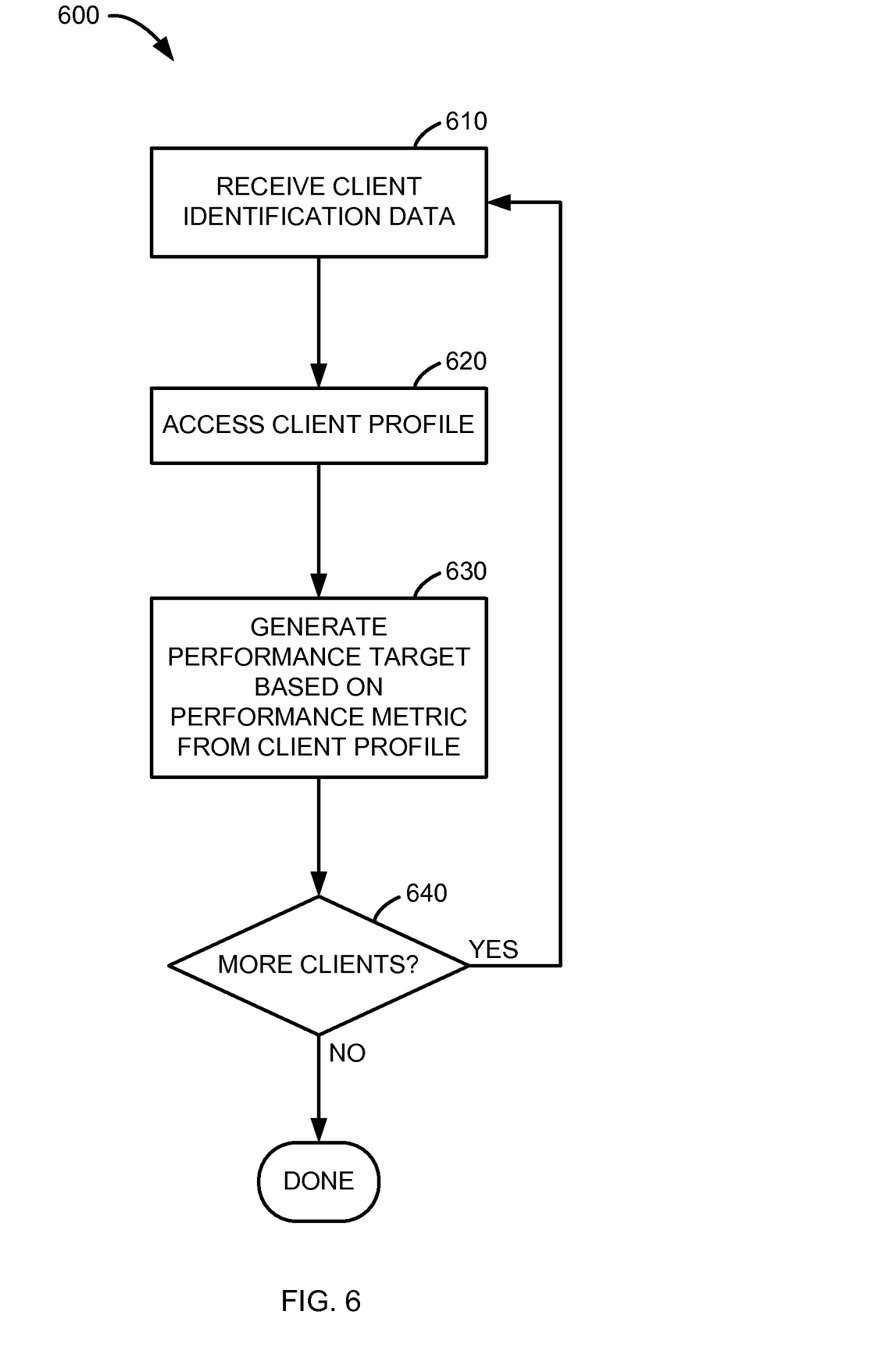
FIG. 6 is a flowchart of an example interactive service management process, according to another implementation.

FIG. 6 is a flowchart of an example interactive service management process that can be implemented at a combination of hardware and software, according to another implementation. Process 600 illustrates generation of a per-client performance target. For example, process 600 could be used to generate initial per-client performance targets for clients of an interactive service. As a specific example, process 600 can replace block 210 of process 200 illustrated in FIG. 2.

Client identification data is received at block 610. Client identification data can be, for example, an Internet Protocol ("IP") address, a username, an account number, a unique identifier, or some other data that identifies a user of an interactive service. The client identification data can be received or accessed by the interactive service and provided to an interactive service management system implementing process 500 by the interactive service. For example, the client identification data can be included in an HTTP cookie requested from a client by the interactive service. Alternatively, the interactive service management system can access the client identification data directly at or from the client.

The client identification data is used to access a client profile associated with the client at block 620. The client profile can be stored, for example, at a database indexed by the client identification data. That is, the client profile can be accessed at the database by providing the client identification data as a key to the database. The client profile includes information related to the client such as client preferences, settings, and performance metrics.

For example, an interactive service management system implementing process 200 can manage an interactive service on a per-client basis (e.g., the interactive service management system modifies a performance target for each client or group of client of an interactive service based on performance measures of the interactive service). The interactive service management system can store or update a performance metric based on an updated performance target for a client in the client profile of that client each time the performance target for that client is modified. The performance metric in a client profile can, therefore, represent a performance or quality of an interactive service that was previously provided to the client associated with that client profile. Alternatively, the performance metric can be updated when a performance indicator suggests that the client is satisfied with the performance of the interactive service. Accordingly, the performance metric in a client profile can represent a performance or quality of an interactive service that is satisfactory or acceptable to the client associated with that client profile.

A performance target for the client for which the client identification data was received is then generated at block 630 based on the performance metric in the client profile. Because the performance metric is based on performance previously provided to the client or with which the client has previously been satisfied, the performance target generated at block 630 describes performance of the interactive service previously provided to the client or with which the client has previously been satisfied. The performance target generated at block 630 can, thus, be a reasonable or good approximation of performance with which the client may be satisfied.

In some implementations, the performance target generated at block 630 can be modified or adjusted (e.g., to a more resource-restrictive or a less resource-restrictive performance target) based on other or additional information included within the client profile. For example, the client profile can include additional information such as an IP address or other information that identifies a location or communications link (or medium) via which the client previously communicated with an interactive service. The performance target generated at block 630 can be modified or adjusted (e.g., to a more resource-restrictive or a less resource-restrictive performance target) if the client is presently communicating with the interactive service via a different communications link. Alternatively, as an example, other information such as an identifier of the device (e.g., a mobile device such as a smartphone or a desktop computing device) via which the client previously communicated with the interactive service can be included at the client profile, and the performance target is adjusted if the client is presently communicating via a different device. As yet another example, the client profile can include a time (e.g., morning, mid-day, evening, or night) at which the client previously communicated with the interactive service, and the performance target is adjusted if the client is presently communicating is at a different time.

If there are more clients of the interactive service at block 640, process 600 returns to block 610 to receive client identification data for another client. Alternatively, in some implementations, multiple clients can be handled in parallel. That is, for example, blocks 610, 620, and 630 can be executed simultaneously or concurrently for multiple clients. If there are no more clients of the interactive service at block 640, process 600 is complete. Process 600 can include additional, fewer, rearranged blocks than those illustrated in FIG. 6. For example, as discussed above, process 600 can be combined with other processes implemented at an interactive service management system.

Figure 7:
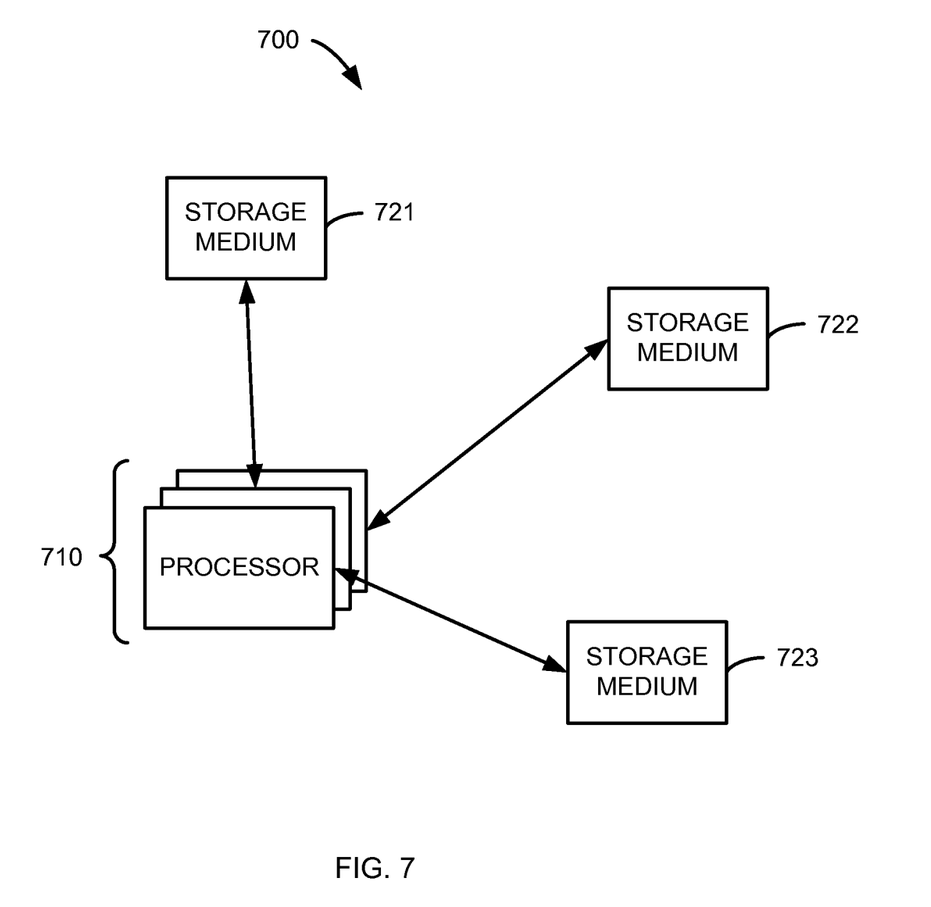
FIG. 7 is a schematic block diagram of an example system including processors and storage media, according to an implementation.

In some implementations, an interactive service management system can be implemented at a system such as a computing device including processors and various storage media. FIG. 7 is a schematic block diagram of an example system including processors (e.g., one or more processors) and storage media (or memories), according to an implementation. As illustrated in FIG. 7, system 700 includes processors 710 operatively coupled to storage medium 721, storage medium 722, and storage medium 723.

Processors 710 can access instructions or code at storage medium 721, storage medium 722, and storage medium 723. Storage media 721, 722, and 723 can be any processor-readable media and/or related devices to access processor-readable media. For example, storage medium 721 can be a hard disk drive including a magnetic storage medium, a solid-state storage medium, or a memristor storage medium; storage medium 722 can be an optical drive such as a DVD drive and can accept DVD storage media on which processor-readable instructions such as processor-readable instructions that implement a report generation tool can be stored; and storage medium 723 can be a FLASH memory drive with a Universal Serial Bus ("USB") interface. In some implementations, storage media 721, 722, and/or 723 can be local to (e.g., coupled to a common computing device) processors 710. In some implementations, storage media 721, 722, and/or 723 can be remote from (e.g., coupled to a separate computing device) processors 710 and in communication with processors 710 via communications link. Furthermore, one or more of storage media 721, 722, and/or 723 can be local to processors 710 and one or more of the remaining of storage media 721, 722, and/or 723 can be remote from processors 710.

As a more specific example, processors 710 can be included within a computing device such as a computing device hosting an interactive service management system having an internal hard disk drive data store represented by storage medium 721 and a removable solid-state data store such as a Secure Digital High-Capacity ("SDHC") memory card represented by storage medium 722. The computing device can also include a USB host controller to communicate with a USB FLASH memory drive represented by storage medium 723. Processors 710 can access processor-executable instructions such as processor-executable instructions that implement an operating system, a software application such an interactive service management system, and/or other software applications at any of storage media 721, 722, and/or 723. Said differently, processors 710 can interpret or execute instructions at processor-readable media (e.g., at storage medium 721, storage medium 722, and/or storage medium 723). For example, a computing device can execute an interactive service management system stored at a remote storage medium.

Alternatively, for example, storage media 721 and 722 can be remote from a computing device including processors 710 and storage medium 723 can be local to that computing device. The computing device including processors 710 can download an interactive service management system from one or both of remote storage media 721 or 722 via a communications link such as a communications network to local storage medium 723, and execute the interactive service management system from local storage medium 723. As another example, storage medium 721 can be a DVD including an installation package for an interactive service management system, and storage medium 722 can be a hard disk drive of a computing device. The installation package can be executed or interpreted at processors 710 to install the interactive service management system at storage medium 722. The computing device can then host or execute the interactive service management system at storage medium 722.

In some implementations, system 700 can include one or more memories such as RAM that function as a cache between one or more of storage medium 721, storage medium 722, and/or storage medium 723 and processors 710 for instructions or code stored (or accessible) at one or more of storage medium 721, storage medium 722, and/or storage medium 723.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules, engines, or elements can be included at different modules, engines, or elements in other implementations. Furthermore, it should be understood that the systems and methods described herein can include various combinations and/or sub-combinations of the components and/or features of the different implementations described. Thus, features described with reference to one or more implementations can be combined with other implementations described herein.

What is claimed is:

1. An interactive service management system, comprising:
   a performance profile module to define a performance measure of an interactive service based on a quality assessment associated with the interactive service and depending on a performance indicator from the client wherein the performance indicator indicates a level of satisfaction that the client has with performance of the interactive service;
   a performance evaluation module to compare the performance measure with a performance target associated with the interactive service and to modify the performance target associated with the interactive service based on the comparing; and
   a performance reporting module to provide the performance target to a resource management module that reallocates resources to the interactive service based on the performance target.

2. The system of claim 1, wherein:
   the performance profile module is to receive the performance indicator associated with the interactive service from the client of the interactive service; and
   the quality assessment includes the performance indicator.

3. The system of claim 1, wherein:
the performance profile module is to receive a plurality of performance indicators associated with the interactive service from a plurality of clients of the interactive service; and
the quality assessment depends on the plurality of performance indicators.

4. The system of claim 1, wherein:
the performance reporting module is further to provide a status indicator associated with the performance measure of the interactive service to a client of the interactive service.

5. The system of claim 1, wherein:
the performance profile module is to access an operational attribute of the interactive service; and
the quality assessment includes the operational attribute.

6. The system of claim 1, wherein the performance evaluation module is to modify the performance target associated with the interactive service to be more resource-restrictive if the performance measure satisfies the first performance target.

7. A non-transitory processor-readable medium storing code representing instructions, the instructions comprising instructions executable to cause a processor to:
generate a performance target of an interactive service with a first value based on a performance metric associated with the interactive service;
define, after the generating, a performance measure of the interactive service based on a quality assessment associated with the interactive service and depending on a performance indicator from the client, wherein the performance indicator indicates a level of satisfaction that the client has with performance of the interactive service;
modify the performance target to have a second value based on the performance measure; and then
provide the performance target to a resource management module that reallocates resources to the interactive service based on the performance target.

8. The non-transitory processor-readable medium of claim 7, wherein:
the performance target is associated with the client; and
the performance metric is associated with the client.

9. The non-transitory processor-readable medium of claim 8, the instructions further comprising instructions executable to cause the processor to:
modify the performance metric based on the performance measure.

10. The non-transitory processor-readable medium of claim 7, wherein the second value of the performance target is more resource-restrictive than the first value of the performance target if the performance measure satisfies the first value of the performance target.

11. The non-transitory processor-readable medium of claim 7, wherein the second value of the performance target is less resource-restrictive than the first value of the performance target if the performance measure does not satisfy the first value of the performance target.

12. The non-transitory processor-readable medium of claim 7, the instructions further comprising instructions executable to cause the processor to:
receive a plurality of performance indicators associated with the interactive service from a plurality of clients of the interactive service; and
discard unauthorized performance indicators from the plurality of performance indicators, the quality assessment depending on the plurality of performance indicators after the discarding.

13. An interactive service management method executing on hardware and comprising:
defining a performance measure of an interactive service based on a quality assessment associated with the interactive service and depending on a performance indicator from the client, wherein the performance indicator indicates a level of satisfaction that the client has with performance of the interactive service;
comparing the performance measure with a first performance target associated with the interactive service; and
providing a second performance target associated with the interactive service to a resource management module associated with the interactive service if the performance measure satisfies the first performance target.

14. The method of claim 13, further comprising:
providing a status indicator associated with the performance measure to a client of the interactive service.

15. The method of claim 13, further comprising:
receiving a second performance indicator from the client;
generating a third performance target based on the second performance indicator and associated with the client;
providing the third performance target to the resource management module; and
assessing a charge to the client based on the second performance indicator.

16. The method of claim 13, further comprising:
defining a plurality of performance measures of the interactive service based on feedback from a plurality of clients; and
updating a plurality of performance metrics based on the plurality of performance measures, each performance metric from the plurality of performance metrics associated with a client from the plurality of clients.

17. The method of claim 13, further comprising:
accessing historical information associated with the interactive service; and
modifying at least one of the performance measure or the second performance target based on the historical information.

* * * * *